July 23, 1963
R. M. WORREL
3,098,341
ROTARY HARVESTERS
Filed April 10, 1961
3 Sheets-Sheet 1
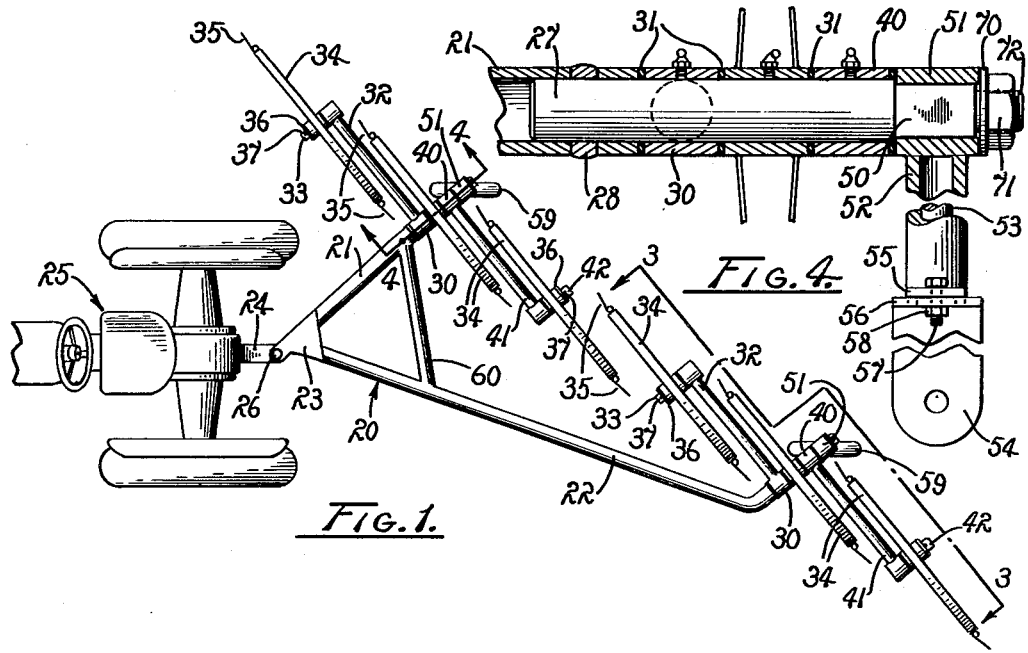
Fig. 4.
Fig. 1.
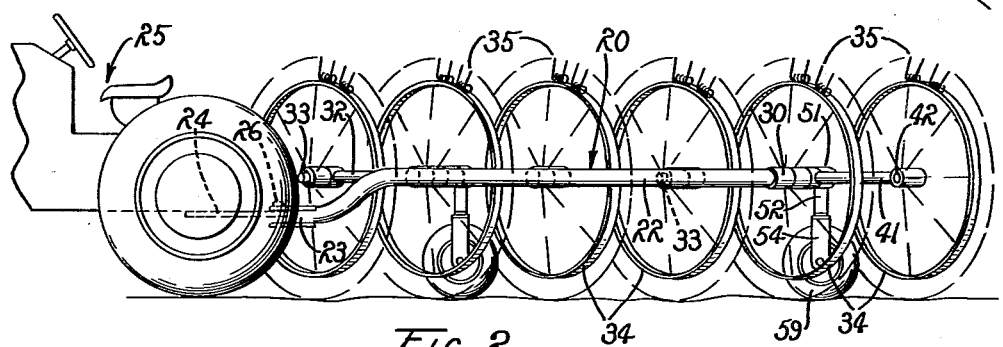
Fig. 2.
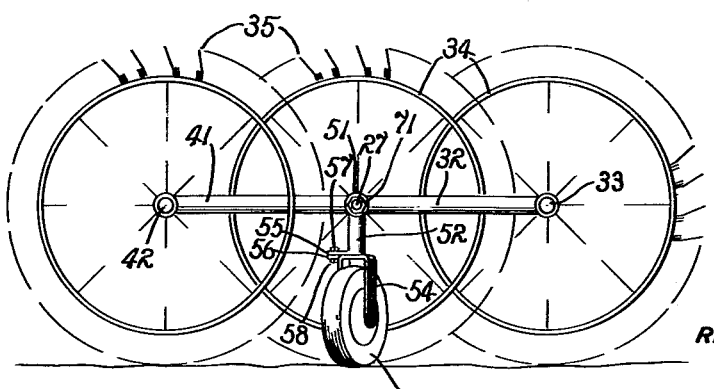
Fig. 3.
RICHARD M. WORREL
INVENTOR
ATTORNEYS

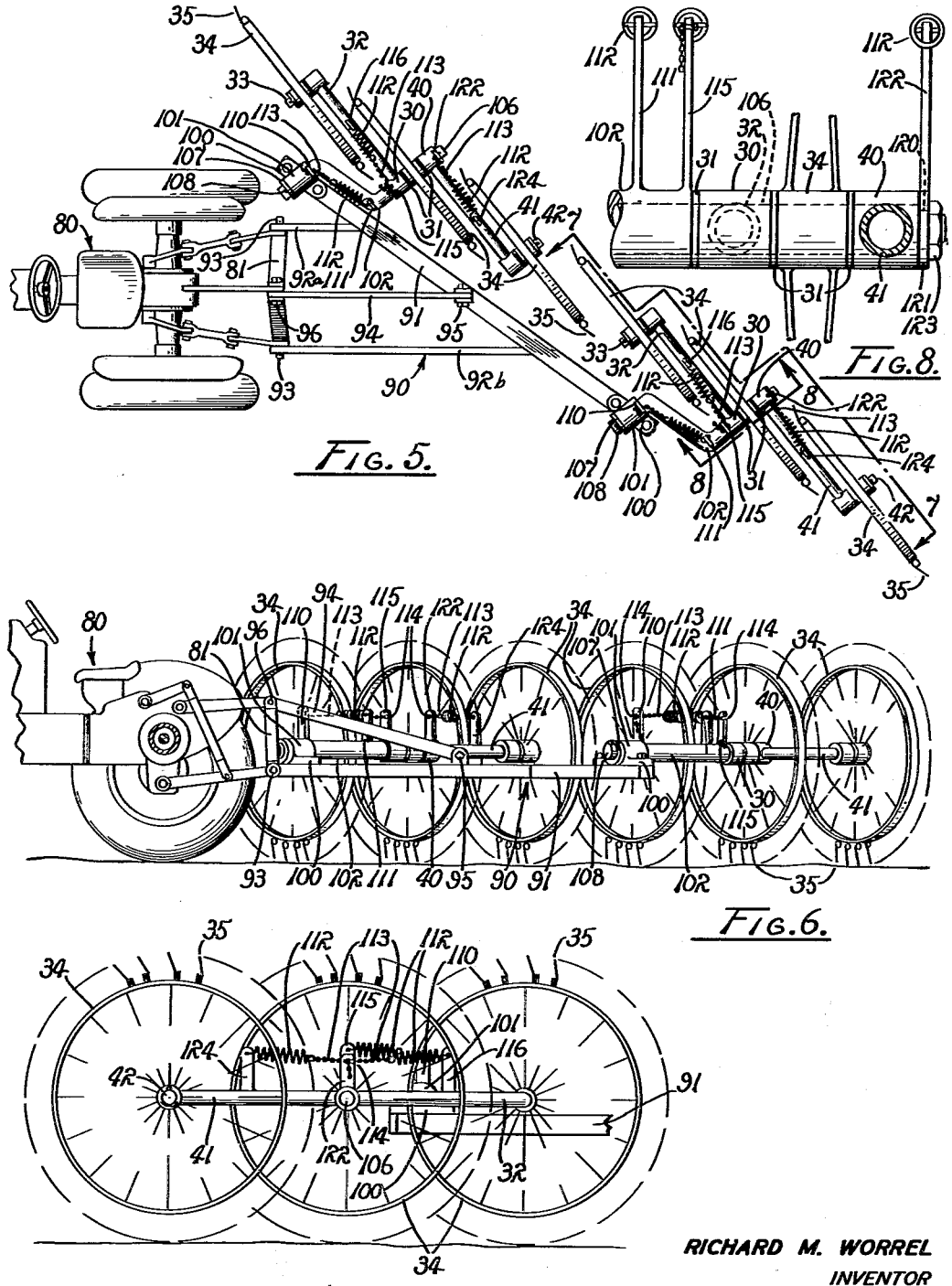

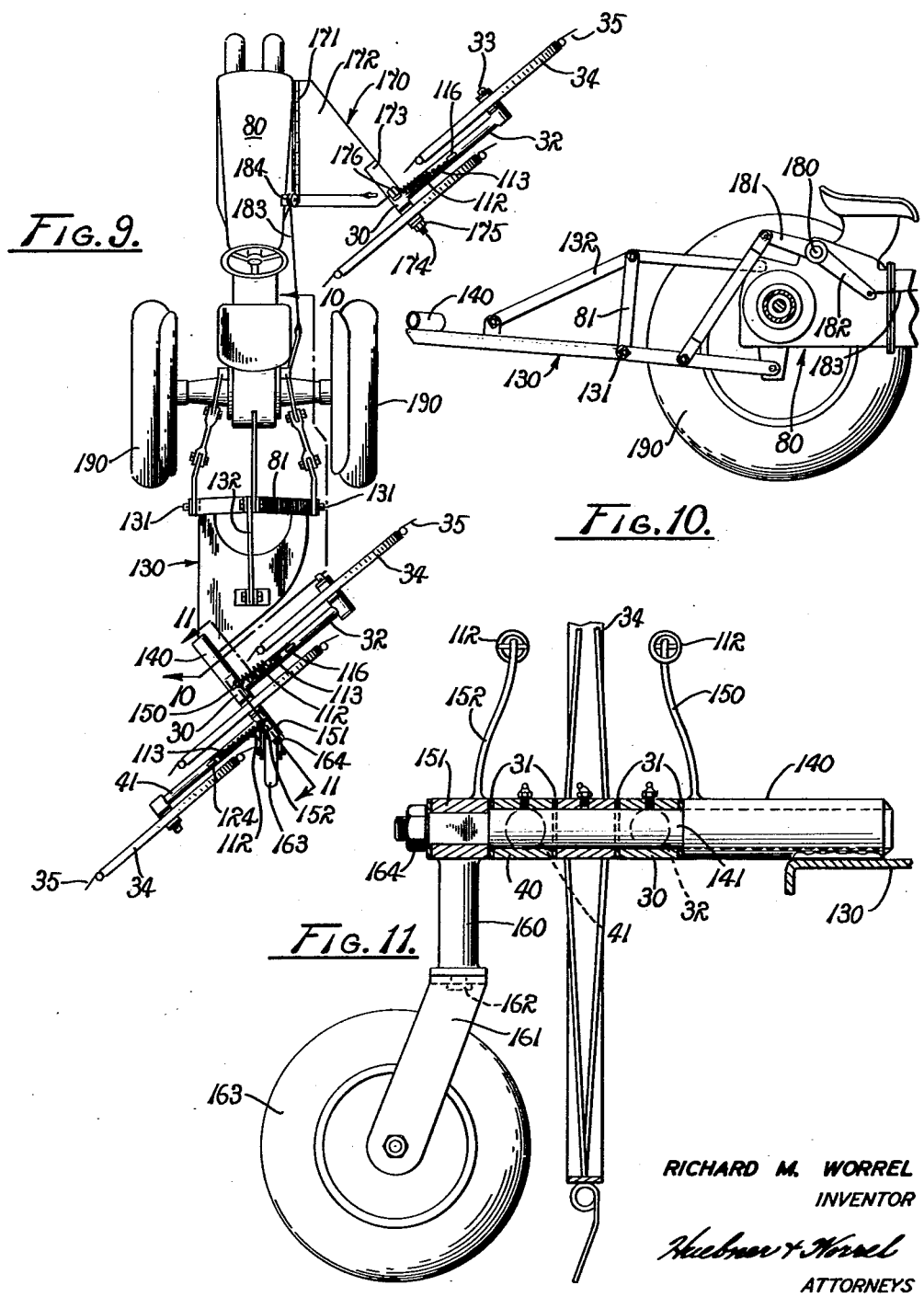

United States Patent Office 3,098,341
Patented July 23, 1963

3,098,341
ROTARY HARVESTERS
Richard M. Worrel, Fresno, Calif., assignor of one-half to Herbert A. Huebner, Los Angeles, Calif.
Filed Apr. 10, 1961, Ser. No. 101,779
10 Claims. (Cl. 56—377)

The present invention relates to rotary harvesters and more particularly to rotary side delivery forage harvesters wherein toothed wheel elements are rotated by ground or crop engagement when motivated in earth traversing movement at an angle oblique to their axes and move engaged crops laterally of said movement. Such harvesters are known in forms adapted for tedding, windrow turning, and raking and are referred to generically as rotary side delivery harvesters.

Since the advent of such harvesters, continuous efforts throughout the world have been made to simplify the structures involved, reduce their costs of production and to improve their operating characteristics. The instant invention is primarily concerned with these broad objects.

Side delivery wheel rakes employ a plurality of rotary raking wheels disposed in echelon arrangement in substantially erect parallel planes oblique to their direction of movement so that when engaged with the ground or a forage crop they are rotated and move the engaged crop laterally. There has been evident evolution and refinement of the means for mounting and motivating such raking wheels but further simplification and economies are desired. Although it has been long known as desirable in such rakes to mount the raking wheels for individual elevational movement so as to conform to contour of terrain traversed, vigorous efforts to simplify the structures have led in certain instances to abandonment of such individual movement and loss of the accommodation to terrain incident thereto.

An object of the present invention is, therefore, to provide an improved rotary side delivery forage harvester.

Another object is to reduce the forms of such harvesters to their simplest structural requirements.

Another object is to provide a rotary forage harvester having a plurality of raking wheels arranged in echelon at an angle to the direction of movement in which the mounting and motivating means for the wheels are of utmost simplicity and economy commensurate with operating efficiency.

Another object is to reduce the production costs for rotary forage harvesters.

Another object is to provide economical sub-assemblies in side delivery forage harvesters of the character described adaptable to varied operational associations.

Another object is to associate a plurality of raking wheels arranged in overlapping echelon arrangement so that one of said raking wheels is elevationally pivotal about the axis of rotation of another of said raking wheels in a manner such that during earth traversing movement drag exerted on the pivotally mounted raking wheel imposes no turning moment eccentrically of the axes of rotation of the associated raking wheel.

Another object is to provide a rotary side delivery harvester of the pull type which minimizes frame requirements.

Another object is to provide a rotary side delivery harvester of the pull type which avoids the previously required arch bars to extend over the raking wheels, or frame elements extended between the raking wheels, to interconnect elements fore and aft thereof.

Further objects and advantages will become more fully apparent as the description proceeds.

In the drawings:

FIG. 1 is a plan view of a harvester embodying the principles of the present invention illustrated as coupled to a tractor which is fragmentarily represented.

FIG. 2 is a side elevation of the structure shown in FIG. 1.

FIG. 3 is a fragmentary rear elevation of the harvester shown in FIG. 1, as viewed from line 3—3 of FIG. 1.

FIG. 4 is a fragmentary section taken on line 4—4 of FIG. 1.

FIG. 5 is a plan view of a second form of harvester of the present invention illustrated as coupled to a fragmentarily represented tractor.

FIG. 6 is a side elevation of the structure shown in FIG. 5.

FIG. 7 is a rear elevation of the second form of harvester, as viewed from line 7—7 of FIG. 5.

FIG. 8 is a fragmentary section taken on line 8—8 of FIG. 5.

FIG. 9 is a plan view of a third form of the present invention coupled to a tractor for earth traversing movement.

FIG. 10 is a fragmentary vertical section taken on line 10—10 of FIG. 9.

FIG. 11 is a fragmentary vertical section taken on line 11—11 of FIG. 9.

*First Form*

Referring in greater detail to the drawings attention is first invited to the embodiment of the invention shown in FIGS. 1 through 4. A substantially flat, horizontal, V-shaped frame 20 is employed having a pair of rearwardly divergent legs 21 and 22. The legs forwardly converge to an apex 23 adapted for connection to the drawbar 24 of a tractor. For reasons soon to become apparent, the height of the frame is normally somewhat greater than that of the drawbar and the forward end portions of the legs are preferably downwardly offset from the plane of the frame, as shown in FIG. 2. A pin 26 releasably connects the apex of the frame to the tractor for horizontal swinging movement, as for turning, and adequate vertical pivoting to accommodate to uneven terrain. The rearward end portions of the legs 21 and 22 receive axles 27 which are substantially horizontal, parallel, and obliquely disposed to the direction of travel of the tractor. Obviously, the axles may be simple extensions of the legs but for fabricating convenience conveniently take the form of shafts telescopically received in tubular legs and welded in position in the legs as at 28 in FIG. 4.

A bearing 30 is rotatably received on each of the axles 27 and a washer 31 positioned between it and its respectively adjacent leg to minimize friction. An arm 32 is rigidly secured to each of the bearings 30 and obliquely forwardly extended therefrom radially of its bearing. An axle 33 is substantially right angularly, obliquely forwardly, extended from the forward end portion of each of the arms 32 in substantially parallel relation to the axles 27. A raking wheel 34 having peripherally disposed teeth 35, or other type of rotary raking assembly, is rotatably mounted on each of the axles 33 and retained in place by means of a washer 36 and cotter key 37, or other suitable means.

As best shown in FIG. 4, another washer 31 is mounted on each of the axles 27 against the rearward end of each of the bearings 30. A raking wheel 34 is rotatably mounted on each axle against the last named washer and a further washer provided rearwardly thereagainst.

A bearing 40 is mounted on each of the axles 27 rearwardly of such axle's respective raking wheel 34. An arm 41 is right angularly obliquely rearwardly extended from each of the bearings 40 and mounts a substantially right angularly, obliquely rearwardly extended axle 42 thereon substantially parallel to the axles 27 and 33.

A raking wheel 34 is rotatbly mounted on each of the axles 42 and held thereon by washers 36 and cotter keys 37 or by any other suitable means. To facilitate freedom of movement of the bearings 40 on their respective axles 27, washers 31 are likewise provided rearwardly thereagainst.

The rearward ends of the axles 27 are preferably of square or other polygonal cross-section, as shown at 50 in FIG. 4. A collar 51 is non-rotatably fitted to the polygonal portion of each of the axles and provides a standard 52 unitary therewith downwardly extended therefrom. The standard is preferably tubular and rotatably receives the post 53 of a bifurcated wheel yoke 54. Brackets 55 and 56 integral with the standard and post respectively, are laterally extended in facing engagement. A bore is provided through the bracket 55 selectively registrable with a plurality of bores in the brackets 56 and the standards and posts are interconnected in adjusted relative rotational positions by a bolt 57 extended through the aligned bores and secured in position by a nut 58. A ground wheel 59 is rotatably mounted in each of the yokes and serves to support the rearward end portion of each leg. For operation, the yokes 54 are adjustably positioned so that the ground wheels are parallel and align with the intended direction of movement of the harvester and thus resist lateral thrust incident to crop engagement by the raking wheels 34. Although the ground wheels 59 independently resist lateral thrust of the three raking wheels in their respective sub-assemblies, the legs 21 and 22 of the frame 20 are nevertheless preferably braced by an interconnecting rigid strut 60.

The collars 51 are conveniently held in place endwardly against the cylindrical portions of their respective axles 27 by washers 70 tightly clamped thereagainst by nuts 71 releasably mounted on screw-threaded rearward end portions of the axles.

*First Form Operation*

It will be noted that the raking wheels 34 are arranged in substantially parallel erect planes oblique to the direction of travel of the tractor 25 and frame 12 in the well known manner. During earth traversing movement, the raking wheels encounter hay or other forage crop disposed on the ground, or the ground itself, and are rotated by the resultant drag imposed on the lower portions of the raking wheels. Such rotation imparts a lateral component of movement to the teeth 35 at the lower peripheries of the wheels to rake the hay or forage laterally. Such raking action rolls the crop into a windrow which is successively cooperatively engaged by the rearwardly adjacent raking wheels until the windrow is discharged by the rearwardmost raking wheel.

In traversing uneven terrain, the wheels 59 act as gauge wheels for their respectively adjacent raking wheels mounted on their axles 27. Thus, in rolling over elevations and depressions, the gauge wheels 59 maintain their respectively adjacent raking wheels in substantially constant predetermined elevation with respect to the surface of the terrain traversed so that said raking wheels are substantially constantly disposed at the most effective elevation in relation thereto. The raking wheels 34 mounted on the forwardly extended arms 32 rise and fall in conformance to the terrain as permitted by elevational pivotal movement of their respective arms. Similarly, the raking wheels on the rearwardly directed arms 41 rise and fall in traversing uneven terrain as permitted by the pivotal movement of their respective arms. It will thus be seen that the described rake retains all of the accommodation to uneven terrain and raking efficiency of early forms of rotary side delivery wheel rakes of more complicated and expensive structure.

*Second Form*

The second form of the invention is illustrated in FIGS. 5 through 8 in association with a tractor 80 having the wellknown hydraulically elevationally controlled A-frame 81 to which implements are conveniently connected. A frame 90 is utilized including a substantially horizontal beam 91 mounted on the A-frame by a pair of arms 92a and 92b pivotally connected at 93 to the A-frame and a link 94 pivotally connected at 95 to the beam and to the upper portion of the A-frame at 96. It will be noted that the beam 91 is obliquely disposed to the normal direction of travel of the tractor and has relative forward and rearward end portions.

A pillow block 100 providing a bearing 101 is mounted at each end of the beam 91. A crank arm 102 is journalled in each of the bearings, rearwardly directed therefrom, and provides a substantially horizontal axle 106 in substantially parallel relation to its bearing. The crank arms are held in association with their respective bearings by any suitable means such as washers 107 and cotter keys 108. One of the bearings 30 is mounted on each of the axles 106 and provides the arm 32 substantially right angularly, obliquely forwardly, extended therefrom. As before, each arm provides an axle 33 substantially parallel to its bearing 30. A raking wheel 34 is journalled on each of the axles 33 and held in position as previously described. For freedom of movement of the bearing, the washers 31 are utilized on opposite sides thereof.

A raking wheel 34 is rotatably mounted on each of the axles 106 rearwardly adjacent to their respective bearings 30. A washer 31 is provided on each of the axles 106 rearwardly of its raking wheel and one of the bearings 40 is journaled on each axle rearwardly adjacent thereto. Each of the bearings has an obliquely rearwardly directed arm 41 providing the axle 42 previously described. Similarly, a rake wheel 34 is rotatably mounted on each of the axles 42 and is retained in place by any suitable means, such as that previously described.

A post 110 is rigidly mounted on each of the bearings 101 and is upwardly extended therefrom. A cooperative lever 111 is rigidly mounted on each of the crank arms 102 rearwardly of its respective bearings. An helical tension spring 112 has a rearward end connected to each lever 111 and a forward end connected to a chain 113 having links selectively engageable in a slot 114 at the upper end of its respective post whereby the tension of the spring is adjustable.

Similarly, a post 115 is rigidly extended upwardly from each of the crank arms 102 adjacent to its bearing 30. A cooperative lever 116 is rigidly mounted on the adjacent arm 32 and upwardly extended therefrom. A spring 112 and chain 113 linkage interconnects the upper ends of the post 115 and levers 116 in the manner previously described.

The rearward end portion of each of the axles 106 provides a short polygonally shaped portion 120 to which a collar 121 is non-rotatably fitted, as illustrated in FIG. 8. A post 122 is rigidly upwardly extended from the collar. A nut 123 is screw-threaded on the rearward end portion of the axle and holds the described bearings, washers, raking wheel and collar in assembled relation. A lever 124 is rigidly upwardly extended from each of the arms 41 in rearwardly spaced relation to their adjacent posts 122 and a spring 112 and chain 113 linkage is releasably connected between the upper ends of the adjacent posts and levers.

*Second Form Operation*

In operation of the second form of the invention, the tractor is adjusted in the known manner so that the A-frame 81 supports the beam 91 at the desired elevation for light engagement of the terrain traversed by the teeth 35 of the raking wheels 34. The raking wheels operate in the manner previously described. However, the axles 106 are supported for floating movement by the springs 112 connected to their levers. The springs are adjusted to support a sufficient amount of the weight borne by the axle 106 so that the teeth of their respective raking wheels lightly engage the crop and/or ground and rise and fall in traversing uneven terrain.

Similarly, the springs connected to the levers 116 and 124 support the raking wheels on the arms 32 and 41 for gentle crop and earth engagement and floating elevational movement. In each instance, the tension of the springs is regulated by selection of the links of their associated chains 113 to locate in the slots of their respective posts.

*Third Form*

The tractor 80 is again shown in FIG. 9 having the A-frame 81. A frame 130 is pivotally connected to the A-frame at 131 and a link 132 utilized in the well-known manner to connect the rearward portion of the frame to the upper portion of the A-frame.

A sleeve 140 is welded on the rear end portion of the frame 130 obliquely to the normal direction of travel of the tractor 80 and an axle 141, similar to axle 27 previously described, is welded in the sleeve and rearwardly extended therefrom.

As best shown in FIGS. 9 and 11, the assembly of washers 31, bearing 30, raking wheel 34 and bearing 40 is mounted on the axle 141. In the same manner, the arm 32 is forwardly extended from the bearing 30 and mounts a raking wheel 34 on the axle 33 and the arm 41 is rearwardly extended from the bearing 40 and mounts a raking wheel on its axle 42. The levers 116 and 124 of the second form of the invention are rigidly upwardly extended from the arms 32 and 41, respectively. A post 150 is rigidly mounted on the sleeve 140 and upwardly extended adjacent to the bearing 30. The rearward end of the axle 141 is of polygonal shape and a collar 151 is non-rotatably fitted thereto. A post 152 is rigidly upwardly extended from the sleeve 140 adjacent to the bearing 40. A spring 112 and chain 113 linkage interconnects each of the levers 116 and 124 with the upper ends of their respectively adjacent posts 150 and 152 so that the forward and rearward raking wheels are supported in floating crop engagement.

A standard 160 integral with the collar 151 is downwardly extended therefrom and a yoke 161 swivelly connected to the standard as by a headed swivel pin 162 connected axially to the standard. The yoke mounts a gauge wheel 163 therein. The collar 151 is securely held in place by a nut 164 screw-threadedly mounted on the rear end of the axle 141.

It will be noted that the sub-assembly including the three raking wheels just described constitutes a three-wheeled rake of simple and economical form. For further simplification, the springs 112 and chains 113 may be omitted as well as their posts 150 and 152 and levers 116 and 124. Further, if desired, the collar 151, standard 160, yoke 162 and wheel 163 may be omitted and the elevation of the frame 130 and middle raking wheel controlled from the tractor by means of its hydraulic control system. If greater raking swath is desired, an auxiliary unit, shown at 170, is utilized.

A hinge member 171 is mounted in a substantially horizontal position on the forward end portion of the tractor and a plate frame 172 laterally extended therefrom for pivotal elevational movement. A sleeve 173 is welded to the plate and rearwardly obliquely extended therefrom to receive an axle 174. As before, a bearing 30 is mounted on the axle 174 with its arm 32 forwardly obliquely extended therefrom and mounting a raking wheel 34 on its forwardly extended axle 33. A raking wheel 34 is rotatably mounted directly on the axle 174 rearwardly of the bearing 30 and a nut 175 is screw-threadedly mounted on the rearward end of the axle to hold the bearing and raking wheel in assembled position. As before, a lever 116 is upwardly extended from the arm 32, a post 176 is rigidly upwardly extended from the sleeve 173 adjacent to the bearing 30 and a spring 112 chain 113 linkage connected between the lever and post resiliently to support the forward end of the arm 32 and its raking wheel for floating movement.

As is well known, the tractor 80 provides an automatic control system for raising and lowering the A-frame 81. As shown in FIG. 10, such system normally includes a horizontal control shaft 180 having a positioning arm 181 rearwardly extended therefrom. Thus, as the shaft 180 is rotated, the control lever rises and falls to raise and lower the A-frame 81 and any implement connected thereto. To control the auxiliary unit, an auxiliary control lever 182 is rigidly extended from the shaft oppositely from the lever 181 so that as the latter rises and falls in controlled movements, the former has a synchronous but opposite movement. A cable 183 is connected to the hinge member 171 at 184 eccentrically of the hinge member 171 and to the auxiliary lever 182. A sheave 184 is mounted on the tractor above the hinge member and the cable tensioned therethrough so that as the lever 182 descends, the plate 172 is raised from operable position to elevate the raking wheels borne thereby to inoperable transport position. As the lever 182 is raised, it slacks off on the cable and the plate pivots downwardly to return the raking wheels to operable position.

*Third Form Operation*

For transport, the control system of the tractor 80 is operated to raise the lever 181 and the A-frame 81. Such movement concurrently lowers the lever 182 and pivots the plate frame 172 upwardly so that all of the raking wheels 34 are supported in elevated inoperable positions.

When it is desired to employ the harvester, the control system is oppositely actuated to lower the A-frame and to permit the plate gravitationally to descend so that the raking wheels mounted on the axles 141 and 174 are in light crop and/or earth engagement. By placing proper links of the chains 113 in the slots of the levers 116, the raking wheels borne by the arms 32 and 41 are supported for floating movement in light crop and/or earth engagement. During operation, the control system of the tractor is released so that the gauge wheel 163 regulates the elevation of the raking wheel journaled on the axle 141.

It will be noted in FIG. 9 that the raking wheels 34 are so arranged that the forwardmost thereof in the auxiliary unit 170 rakes encountered crops in the usual manner and passes it to the raking wheel mounted on the axle 174 which deposits the crop in a windrow, not shown, so positioned as to be straddled by the rear tractor wheels 190. The raking wheels of the auxiliary unit are so related to the three raking wheels arranged in echelon at the rear of the tractor that the windrow formed by the forward two raking wheels is delivered to the forwardmost of the three rearward raking wheels which continue the windrow to the side and add to it the crop encountered in their swath of movement, depositing the resultant total windrow at the rearward periphery of the rearwardmost raking wheel.

*Operational Summary*

It will be evident that the three forms of the present invention shown in the drawings possess the advantages characteristic of the commercially acceptable forms of rotary side delivery harvesters. The raking wheels are ground or crop driven and independently rise and fall in traversing uneven terrain so as to rake efficiently over elevations and through depressions. The raking wheels may be of the rim type shown, or be of the finger assembly type known in the art, having no rims.

The raking wheels 34 may be supported in their floating movement entirely by the raking teeth 35 or be lightened in crop and ground engagement as by the springs 112. The central axles 27 and 141 of the raking wheels may be supported in earth traversing movement by gauge wheels 59 or 163, if preferred. Further, the central axles may be supported directly from the tractor 25 or 80 or any suitable tractor or other mobile hitch desired.

However, the present invention provides more significant advantages over previously known rotary side delivery harvesters. In rotary side delivery wheel harvesters which are pulled or towed, it has heretofore been necessary to employ arch bars to extend over the raking wheels or arcuate or angular beams extended between the raking wheels in order to interconnect frame structures and/or ground wheels rearwardly of the raking wheels with the towing vehicle. The present invention has eliminated such structure and is believed to have thereby provided frame structures of an irreducible minimum and maximum simplicity. It will be noted that in all forms of the invention illustrated, there is at least one raking wheel journalled on an axle which has a forward end to which connection is made for draft purposes and a rearward end which provides connection to a gauge wheel, other raking wheel, or whatever structure is disposed rearwardly of its raking wheel. In effect, instead of requiring arch bars extended over the raking wheels or arcuate or angled bars extended between the raking wheels, the axle of a raking wheel is utilized as the interconnecting frame structure. Such axle may be attached to or simply constitute an extension of, legs such as 21 and 22 or other frame structure.

It will also be noted that the arms 32 and 41 with their respective bearings 30 and 40 and axles 33 and 42 constitute crank arms. While it has been known in rotary side delivery wheel harvesters both to push and to pull crank arms, the present invention utilizes such arms in a novel and highly advantageous manner by pivotally mounting them on the axle of an intermediate raking wheel concentrically of the axis of rotation thereof. Thus, the raking wheels on the pushed and pulled crank arms can rise and fall independently of the central raking wheel in arc concentrically thereto and, with such concentric association, drag imposed upon such forward and rearward raking wheels has no turning moment on the axle of the central raking wheel or structure connected thereto, such as the gauge wheels.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A rotary side delivery forage harvester wherein toothed wheel elements rotated by ground or crop engagement when drawn at an angle oblique to their axes move engaged crops laterally, the improvement which comprises an elongated draft frame element provided at a forward end with tractor coupling means permitting vertical rise and fall of the rear end, said rear end terminating in a first axle integral therewith, a toothed wheel element freely rotatably mounted on said first axle, a pair of crank arms also mounted concentrically on said axle for elevational pivotal movement and oppositely extended therefrom generally normal thereto, second and third axles provided respectively at the outward extremity of each crank arm and having their axes generally parallel to the axis of the first axle, and toothed wheel elements freely rotatably mounted on said second and third axles, whereby the three wheel elements can individually and independently rise and fall in their draft course over terrain.

2. In a rotary side delivery wheel rake having a frame adapted for earth traversing movement in a direction in predetermined relation thereto, the combination of an axle mounted on the frame and substantially horizontally extended therefrom obliquely to said direction of movement, a raking wheel journaled on the axle for free rotation thereon, a crank arm journaled on the axle rearwardly of the wheel and radially extended obliquely rearwardly therefrom, a crank arm journaled on the axle forwardly of the wheel and radially forwardly extended therefrom, the crank arms having extended ends providing axle portions substantially parallel to said axle, and associated raking wheels individually journaled on the axle portions of the crank arms for free rotation thereon in forwardly and rearwardly overlapping relation respectively to the raking wheel on the axle.

3. A rotary harvester comprising a traction element having a forward end adapted for connection to a draft appliance for horizontal swinging movement of said element and a rearward end providing a substantially horizontal first axle, second and third axles disposed on opposite sides of the first axle, a pair of arms journaled on the first axle and oppositely extended therefrom individually mounting the second and third axles thereon in substantially horizontal positions generally parallel to the first axle, substantially erect rotary crop engaging means individually journaled on the axles in for free rotation generally parallel relation, and a ground engaging direction control wheel mounted on the first axle opposite of its raking wheel from the forward end of the traction element in supporting relation to the rearward end of the tractive element directing the harvester during earth traversing movement along a line oblique to said raking wheels.

4. A rotary harvester comprising a substantially horizontal V-shaped traction frame having an apex adapted for connection to a draft appliance for horizontal swinging movement of said frame and legs divergently substantially radially extended from the apex terminating in substantially parallel first axles rigid therewith second and third axles disposed on opposite sides of each of the first axles; a pair of arms journaled on each of the first axles and oppositely extended therefrom individually mounting their respective second and third axles in substantially horizontal positions generally parallel to the first axles, substantially erect rotary raking wheels individually journaled on the axles in generally parallel relation, and a ground engaging direction control wheel mounted on each of the first axles opposite to their respective raking wheels from the apex in supporting relation to the extended ends of the divergent legs, said direction control wheels being substantially parallel and disposed in planes oblique to the raking wheels.

5. In a rotary forage harvester, the combination of three substantially horizontal and parallel axles, there being a central axle and an axle on each side of the central axle, raking wheels individually journaled on the axles for free rotation in substantially parallel overlapping relation, means pivotally mounted concentrically on the central axle interconnecting the central axle and the side axles in fixed spaced relation for independent arcuate elevational movement of the side axles concentrically of the central axle, and means connected to the central axle mounting said central axle for floating elevational movement and for imparting earth traversing movement to the axles, arms and wheels in a direction oblique to said wheels.

6. In a rotary forage harvester, the combination of three substantially horizontal and parallel axles, there being a central axle and an axle on each side of the central axle, raking wheels individually journaled on the axles in substantially parallel overlapping relation, means pivotally mounted concentrically on the central axle interconnecting the central axle and the side axles in fixed spaced relation for independent arcuate elevational movement of the side axles concentrically of the central axle, means connected to the central axle mounting said central axle for floating elevational movement and for imparting earth traversing movement to the axles, arms and wheels in a direction oblique to said wheels, substantially erect post elements mounted on the central axle, and tension members individually connected to the post elements and to the means interconnecting the axles in weight supporting relation to the side axles and their raking wheels.

7. A rotary harvester comprising a frame, means for connecting the frame to a tractor for support by the tractor during earth traversing movement, a first crank arm pivotally mounted in the frame having a first axle disposed in oblique relation to the direction of movement of the tractor, a second crank arm pivotally mounted concentrically on the first axle and forwardly extended therefrom having a second axle substantially parallel to the first axle, a third crank arm pivotally mounted concentrically on the first axle and rearwardly extended therefrom providing a third axle in substantially parallel relation to the first axle, and raking wheels individually journaled on the axles for free rotation in substantially parallel overlapping relation oblique to the direction of movement of the tractor.

8. A rotary harvester comprising a frame, means for connecting the frame to a tractor for support by the tractor during earth traversing movement, a first crank arm pivotally mounted in the frame having a first axle disposed in oblique relation to the direction of movement of the tractor, a second crank arm pivotally mounted concentrically on the first axle and forwardly extended therefrom having a second axle substantially parallel to the first axle, a third crank arm journaled on the first axle and rearwardly extended therefrom providing a third axle in substantially parallel relation to the first axle, raking wheels individually journaled on the axles in substantially parallel overlapping relation oblique to the direction of movement of the tractor, a substantially erect post mounted on the frame adjacent to the first crank arm, substantially erect posts mounted on the first axle adjacent to the second and third crank arms respectively, and tension means individually interconnecting the posts and their respectively adjacent crank arms in supporting relation to the raking wheels journaled thereon.

9. In a rotary harvester adapted for earth traversing movement in a direction in predetermined relation thereto having forward, central and rearward raking wheels arranged in overlapping echelon relation oblique to said direction of travel and rotated by crop engagement during earth traversing movement whereby each of the raking wheels during operation has a forward descending peripheral portion and a rearward ascending peripheral portion, said raking wheels being in axially adjacent spaced relation; the combination of a substantially horizontal first axle mounting the central raking wheel for floating elevational movement, a forward crank arm disposed between the forward and central raking wheels pivotally mounted concentrically on the first axle and obliquely forwardly extended therefrom providing a terminal axle substantially parallel to the first axle rotatably mounting the forward raking wheel thereon, the forward crank arm being disposed in rearward adjacent proximity to the ascending portion of the forward raking wheel, and a rearward crank arm disposed between the central and rearward raking wheels pivotally mounted concentrically on the first axle and obliquely rearwardly extended therefrom providing a terminal axle substantially parallel to the first axle rotatably mounting the rearward raking wheel thereon, the rearward crank arm being disposed in rearward adjacent proximity to the ascending portion of the central raking wheel.

10. In a rotary forage harvester adapted for earth traversing movement in a direction in predetermined relation thereto, the combination of a substantially horizontal first axle obliquely disposed to said direction of movement, a central raking wheel journaled on the first axle for free rotation thereon, a forward arm pivotally mounted concentrically on the first axle forwardly adjacent to the central raking wheel and forwardly extended therefrom obliquely to the direction of earth traversing movement and substantially parallel to said central raking wheel providing a second axle forwardly substantially horizontally extended from the forward end thereof substantially parallel to the first axle, a forward raking wheel journaled on the second axle in forward overlapping relation to the central raking wheel and in forward adjacent proximity to the forward arm, a rearward arm pivotally mounted concentrically on the first axle rearwardly adjacent to the central raking wheel and rearwardly extended therefrom obliquely to the direction of earth traversing movement and substantially parallel to said central raking wheel providing a third axle rearwardly substantially horizontally extended from the rearward end thereof substantially parallel to the other axles, the rearward arm being in rearward adjacent proximity to the central raking wheels and a rearward raking wheel journaled on the third axle in rearward overlapping relation to the central raking wheel.

References Cited in the file of this patent

UNITED STATES PATENTS

| Re. 23,411 | Stenzel | Sept. 11, 1951 |
| Re. 24,294 | Krause | Mar. 26, 1957 |
| 2,459,961 | Pollard | Jan. 25, 1949 |
| 2,657,519 | Hill | Nov. 3, 1953 |
| 2,816,414 | Van der Lely et al. | Dec. 17, 1957 |
| 2,836,030 | Van der Lely et al. | May 27, 1958 |
| 2,925,702 | Plant | Feb. 23, 1960 |
| 3,014,334 | Van der Lely et al. | Dec. 26, 1961 |